United States Patent
Hüttel et al.

(10) Patent No.: US 11,110,780 B2
(45) Date of Patent: Sep. 7, 2021

(54) ASSEMBLY HAVING TWO ROOF FRAME ELEMENTS, ROOF FRAME AND A VEHICLE ROOF OF A MOTOR VEHICLE

(71) Applicant: Webasto SE, Stockdorf (DE)

(72) Inventors: Philipp Hüttel, Stockdorf (DE); Moritz Pradella, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 50 days.

(21) Appl. No.: 16/591,868

(22) Filed: Oct. 3, 2019

(65) Prior Publication Data

US 2020/0114740 A1 Apr. 16, 2020

(30) Foreign Application Priority Data

Oct. 12, 2018 (DE) .......................... 102018125313.3

(51) Int. Cl.
| | |
|---|---|
| *B60J 7/043* | (2006.01) |
| *B60J 7/04* | (2006.01) |
| *B62D 29/00* | (2006.01) |
| *B60J 10/80* | (2016.01) |
| *B60J 10/34* | (2016.01) |

(52) U.S. Cl.
CPC ............... *B60J 7/043* (2013.01); *B60J 7/04* (2013.01); *B60J 10/34* (2016.02); *B60J 10/80* (2016.02); *B62D 29/001* (2013.01)

(58) Field of Classification Search
CPC ... B60J 7/022; B60J 7/043; B60J 7/047; B60J 7/05; B60J 7/053; B60J 7/0573
USPC ............................ 296/216.02, 216.06–216.08
See application file for complete search history.

(56) References Cited

U.S. PATENT DOCUMENTS

| | | | | |
|---|---|---|---|---|
| 4,333,680 A | * | 6/1982 | Wolf ........................ | B60J 7/022 29/401.1 |
| 5,842,265 A | * | 12/1998 | Rink ................. | B29C 45/14221 29/460 |
| 7,393,047 B2 | * | 7/2008 | Hirotani ................. | B62D 25/06 296/214 |
| 2017/0313168 A1 | | 11/2017 | Hoelzel | |

FOREIGN PATENT DOCUMENTS

| | | |
|---|---|---|
| DE | 19641462 A1 | 4/1998 |
| DE | 10159301 A1 | 6/2003 |
| DE | 102005047390 B4 | 5/2007 |
| DE | 102014117049 A1 | 5/2016 |

* cited by examiner

*Primary Examiner* — Dennis H Pedder
(74) *Attorney, Agent, or Firm* — Fitch, Even, Tabin & Flannery, LLP

(57) ABSTRACT

An assembly for a roof of a motor vehicle having two roof frame elements. The two roof frame elements are arranged in such a way relative to one another that a region of overlap is formed, in which the two roof frame elements overlap one another, a plastic jacket, which covers the region of overlap and seals off the region of overlap, wherein the following are formed along the region of overlap in a manner offset with respect to one another: a joining location, at which the two roof frame elements are connected to one another and which is covered by the plastic jacket to seal off the joining location, an adhesive bonding location, which is formed on an outer side of the plastic jacket, for the application of an adhesive.

13 Claims, 6 Drawing Sheets

Figure 1:
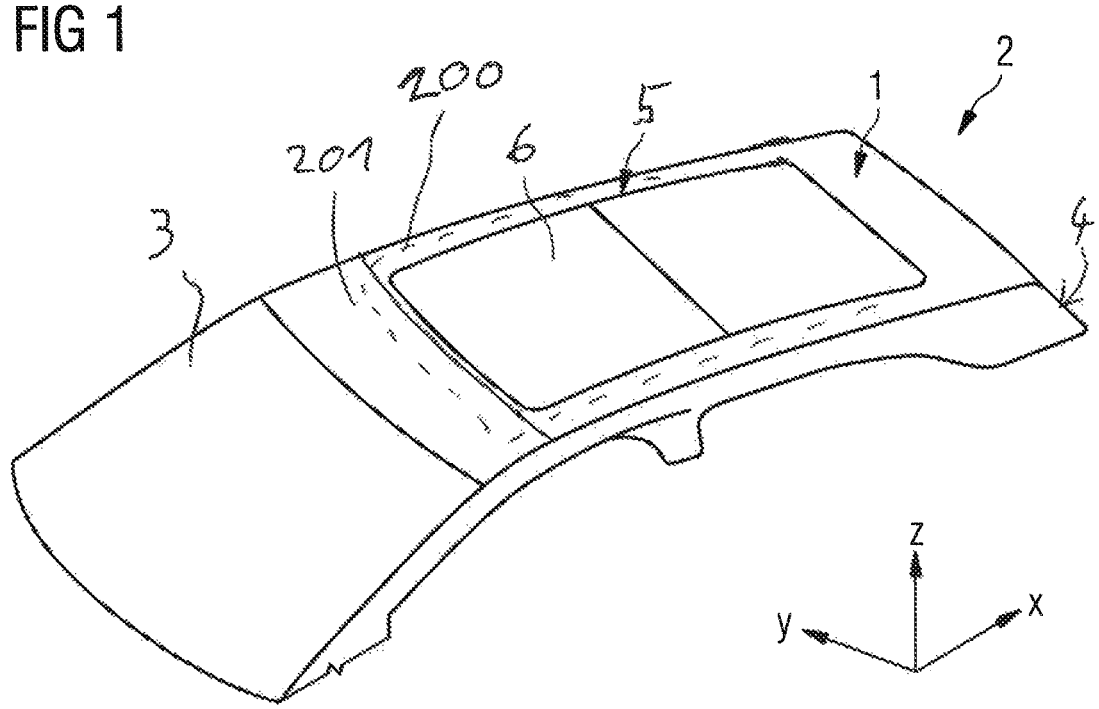

ASSEMBLY HAVING TWO ROOF FRAME ELEMENTS, ROOF FRAME AND A VEHICLE ROOF OF A MOTOR VEHICLE

CROSS-REFERENCE TO RELATED APPLICATION

This application claims priority from German Patent Application Number DE 10 2018 125 313.3, filed Oct. 12, 2018, which is hereby incorporated herein by reference in its entirety for all purposes.

An assembly comprising two roof frame elements for a vehicle roof of a motor vehicle is specified. A roof frame for a vehicle roof of a motor vehicle and a vehicle roof of a motor vehicle are furthermore specified. Moreover, a motor vehicle having a roof frame is specified.

There are known roof frames for motor vehicle roofs, e.g. for sliding roofs, which are punched out of a blank. Integral roof frames of this kind have sufficient rigidity to meet requirements, e.g. those in respect of rigidity, in the region of the vehicle roof.

It is desirable to specify an assembly comprising two roof frame elements for a vehicle roof of a motor vehicle which has a small installation space requirement and is sufficiently rigid. It is furthermore desirable to specify a roof frame for a vehicle roof of a motor vehicle which has a small installation space requirement and is sufficiently rigid. Moreover, it is desirable to specify a vehicle roof for a motor vehicle which has sufficient rigidity. It is furthermore desirable to specify a motor vehicle which has a roof frame and is of sufficiently rigid design.

According to one embodiment, an assembly has two roof frame elements for a vehicle roof of a motor vehicle. In particular, the assembly is part of a roof frame. According to at least one embodiment, a vehicle roof for a motor vehicle has a roof frame of this kind. According to at least one embodiment, a motor vehicle has a roof frame of this kind.

The two roof frame elements are arranged in such a way relative to one another that a region of overlap is formed. In the region of overlap, the two roof frame elements overlap one another. The assembly has a plastic jacket. The plastic jacket covers the region of overlap. The plastic jacket seals off the region of overlap, in particular against water or other fluids, e.g. a solution from a washer. A joining location and an adhesive bonding location are formed in a manner offset with respect to one another along the region of overlap. The two roof frame elements are connected to one another at the joining location. The joining location is covered by the plastic jacket in order to seal off the joining location, e.g. against water or other fluids. The adhesive bonding location is formed on an outer side of the plastic jacket, for the application of an adhesive.

The two roof frame elements are part of a roof frame for a vehicle roof, for example. The roof frame surrounds, partially or completely for example, a roof opening of the vehicle roof, which can be closed by a cover panel. The cover panel can be a fixed element, which is arranged in such a way that it cannot move relative to the rest of the roof, or can be a movable cover panel, thus enabling the roof opening to be at least partially exposed. Particularly in the case of a movable cover panel, the roof frame elements are used to attach various subassemblies, e.g. a mechanism for moving the cover panel. Moreover, the roof frame elements are intended for attachment to the body shell of the vehicle, e.g. by means of the adhesive. The roof frame elements also contribute to the rigidity of the body during operation, for example. A front cover can also be adhesively bonded onto the roof frame element. According to some embodiments, a roof frame element is assembled from a plurality of individual parts. The individual parts are welded together, for example. Structurally rigid adhesive bonding of the roof frame element to the body shell is also possible.

The use of two roof frame elements or several roof frame elements allows versatile application. Thus, the assembly can be used on a very wide variety of vehicles without the need to implement completely new roof frames in each case. The assembly comprising the two roof frame elements allows modular construction of the roof frame. For example, the roof frame elements are each adapted in length and width in such a way that the roof frame elements can be used in several different vehicles, at least in some cases.

The region of overlap at which the joining location and the adhesive bonding location are arranged in a manner offset with respect to one another allows space-saving arrangement of the two locations. Thus, it is also possible to implement the various required functions of the roof frame with the modularized roof frame. At the joining location, the roof frame elements are connected to one another in a manner sufficiently robust to achieve the required rigidity. In particular, more than one joining location is provided, e.g. two, three, four or more joining locations, which are formed in a manner offset with respect to one another.

Both the two roof frame elements and the joining location, which passes through the two roof frame elements, for example, are sealed off by means of the plastic jacket. In particular, the plastic jacket allows sufficiently leak-tight sealing, which is also sealed with respect to capillary effects. Thus, the arrangement allows sufficient sealing of the vehicle interior against water or other fluids during operation. In addition, the region of overlap of the two roof frame elements can be bridged between the two roof frame elements by means of the plastic jacket in such a way that the adhesive bonding location at which the adhesive is reliably applied is formed. In particular, there are no steps between the roof frame elements and the adhesive bonding location, which steps would be disadvantageous for the adhesive.

The plastic jacket can furthermore partially compensate for manufacturing tolerances in the joining location and for concealed punching burrs.

The region of overlap has a longer extent in one direction along the two roof frame elements, e.g. the vehicle longitudinal direction, than in the two directions transverse to said direction. Along this main direction of extent of the region of overlap, the joining location and the adhesive bonding location are arranged in a manner offset with respect to one another. In a plan view, the joining location and the adhesive bonding location are arranged adjacent to one another. According to some illustrative embodiments, the joining location and the adhesive bonding location partially overlap. According to other illustrative embodiments, the joining location and the adhesive bonding location are arranged in such a way adjacent to one another that they do not overlap. The offset arrangement of the joining location and of the adhesive bonding location enables the region of overlap to be formed so as to be flat, together with the plastic jacket. Thus, a small installation space requirement can be achieved. In particular, the installation space requirement of the assembly comprising two roof frame elements is no greater or only insignificantly greater than with an integral roof frame.

According to one embodiment, a sealing location is formed on the outer side of the plastic jacket, for the application of a seal. Along the region of overlap, the sealing location is formed in a manner offset with respect to the joining location and the adhesive bonding location. In particular, the sealing location is used for bonding on the seal, which separates a wet region and a dry region. During operation, the seal provides sealing relative to the cover panel, for example. Consequently, the adhesive bonding of the seal on the two roof frame elements and the plastic jacket must be leak-tight with respect to water and, in particular, must counteract capillary effects. By virtue of the offset arrangement of the sealing location with respect to the adhesive bonding location and the joining location, a flat design of the region of overlap with the plastic jacket is possible. The plastic jacket ends at the two roof elements without a step which would compromise leak-tightness between the seal and the plastic jacket as well as the two roof elements.

For example, more than one joining location, more than one adhesive bonding location and more than one sealing location are provided. The adhesive bonding location and/or the sealing location can be arranged on both sides of the plastic jacket. By virtue of the offset arrangement of the individual locations, only the installation space requirement for the individual location is required in each case. The situation would be different in the case where the adhesive bonding location was arranged above the joining location, for example. In that case, installation space would be required for both locations. In contrast, the offset arrangement allows a flat configuration and, at the same time, reliable functioning of the individual locations.

According to one embodiment, the two roof frame elements each have a surface outside the region of overlap. The outer side of the plastic jacket and the surfaces of the roof frame elements adjoin one another in a flush manner at the adhesive bonding location and the sealing location. Thus, reliable sealing is possible. The seal and/or the adhesive is prevented from becoming detached during operation at the transition between the plastic jacket and the roof frame elements. In particular, it is possible in this way to counteract capillary effects.

According to at least one embodiment, the region of overlap is arranged transversely to the two main directions of extent of the region of overlap, in a manner offset with respect to adjoining regions of the roof frame elements. The region of overlap has a longer extent along each of the two main directions of extent than in the third direction transverse to said directions. In the region of overlap, the roof frame elements are arranged in a stepped manner relative to the adjoining regions of the roof frame elements, in particular in the region of the adhesive bonding location and in the region of the sealing location. Thus, it is possible to create sufficient space for the plastic of the plastic jacket and, at the same time, to achieve flush ending of the plastic jacket with the adjoining regions of the roof frame elements. This, in turn, allows a flat construction of the assembly. According to one embodiment, a further adhesive bonding location is formed on a second outer side of the plastic jacket. The further adhesive bonding location is used for the application of a further adhesive. The outer side and the second outer side are situated opposite one another. Along the region of overlap, the further adhesive bonding location is formed in a manner offset with respect to the joining location and the adhesive bonding location and, according to some embodiments, also with respect to the sealing location. For example, the further adhesive is used to connect the roof frame elements to a vehicle body, e.g. as a structurally rigid adhesive. The adhesive then serves to connect the roof frame elements to a cover, for example. The further adhesive bonding location is of corresponding design to the first adhesive bonding location and, as a result, allows a flat construction of the assembly. At the further adhesive bonding location, the plastic jacket and the adjoining regions of the roof frame elements adjoin one another in a flush manner, with the result that the adhesive allows reliable connection of the roof frame elements, e.g. of the body, and sufficient sealing during operation.

According to one embodiment, the roof frame elements are connected positively to one another. For example, the roof frame elements are connected to one another by means of a joining element. For example, the two roof frame elements are connected to one another at the joining locations by means of rivets, e.g. by means of self-piercing rivets. The rivets penetrate the two roof frame elements and connect them to one another. The plastic jacket seals off the riveting location and thus counteracts corrosion of the roof frame elements at the joining location.

As an alternative or in addition, the roof frame elements are connected materially to one another. For example, a purely material connection by means of an adhesive is provided.

According to one embodiment, the roof frame elements each comprise coated steel sheets. For example, the roof frame elements are each formed from a coated steel sheet. This has a sufficient rigidity and stability as well as strength and impact resistance. For example, the steel sheets of the two roof frame elements are coated by means of dip coating, e.g. cathodic dip coating. At the joining locations, the coating is partially removed owing, for example, to the connection of the two roof frame elements to one another. The steel sheets of the roof frame elements are nevertheless sufficiently protected by means of the plastic jacket. According to other embodiments, the roof frame elements are manufactured from a different material, e.g. from some other metal or a plastic.

According to at least one embodiment, the plastic jacket is formed from a cured polyurethane. For example, the plastic jacket is formed or moulded onto the two roof frame elements. Other plastic materials are also possible.

According to at least one embodiment, a roof frame for a vehicle roof of a motor vehicle has an assembly according to at least one embodiment. The roof frame has an adhesive. The adhesive extends transversely to the region of overlap from one of the roof frame elements, along the adhesive bonding location, to the other of the roof frame elements. The adhesive serves to secure a cover, for example. For example, the roof frame has the cover, which is connected to the assembly by means of the adhesive. The adhesive bonding location is formed on the roof frame in such a way that the adhesive extends continuously from one of the roof frame elements, along the adhesive bonding location of the plastic jacket, to the other of the roof frame elements.

According to at least one embodiment, the roof frame has the seal, which extends transversely to the region of overlap from one of the roof frame elements, along the sealing location, to the other of the roof frame elements. During operation, the seal serves for sealing relative to a cover panel, for example. The sealing location is formed in such a way that the seal extends continuously from one of the roof frame elements, along the sealing location of the plastic jacket, to the other of the roof frame elements.

According to at least one embodiment, the roof frame has the further adhesive. The further adhesive extends transversely to the region of overlap from one of the roof frame elements, along the further adhesive bonding location, to the other of the roof frame elements. The further adhesive bonding location is formed in such a way that the further adhesive extends continuously from one of the roof frame elements, along the further adhesive bonding location of the plastic jacket, to the other of the roof frame elements.

According to at least one embodiment, a vehicle roof for a motor vehicle has a roof frame according to at least one embodiment. The roof frame can be connected to a body of the motor vehicle by means of the adhesive. In addition, screw fastening to the body is also possible.

According to at least one embodiment, the motor vehicle has a roof frame according to at least one embodiment. The roof frame is connected to the body of the motor vehicle by means of the adhesive. Thus, the body and the roof frame are reliably connected to one another and sealed off with respect to one another, wherein sufficient rigidity with a small installation space requirement is achieved.

Further advantages, features and developments will be found in the following examples explained in conjunction with the figures.

Elements which are the same, are of the same type or have the same action are provided with the same reference signs throughout the several figures,
of which:

FIG. 1 shows a schematic illustration of a vehicle roof of a motor vehicle,

FIGS. 2 to 7 each show schematic illustrations of an assembly according to one illustrative embodiment.

FIG. 1 shows a schematic illustration of a vehicle roof 1 of a motor vehicle 2. A vehicle longitudinal direction X extends from the windscreen 3 in the direction of a rear window 4 of the motor vehicle 2. A vehicle transverse direction Y furthermore extends in the roof plane of the motor vehicle 2. In particular, the directions X and Y are perpendicular to one another. Extending perpendicularly to the directions X and Y is the direction Z, which corresponds to a vertical in the normal operating position.

The vehicle roof 1 has a roof opening 5. In the illustration in FIG. 1, the roof opening 5 is completely closed by a cover panel 6 or a plurality of cover panels. For example, at least one of the cover panels 6 can be moved along the X direction relative to the rest of the vehicle roof 2. Thus, the roof opening 5 can be at least partially exposed. As an alternative or in addition, one of the cover panels 6 is designed as a fixed roof element and is connected immovably relative to the vehicle roof 1. The cover panel 6 is a glass cover panel or a panoramic roof, for example.

A roof frame 200 is formed along an edge of the roof opening 5. The roof frame 200 is made up of a plurality of roof frame elements 101, 102 (e.g. FIG. 2). In the illustrative embodiment shown, the roof frame 200 has a cover 201, which covers the roof frame elements 101, 102 with respect to the outside in the region above the windscreen 3.

Figure 2:
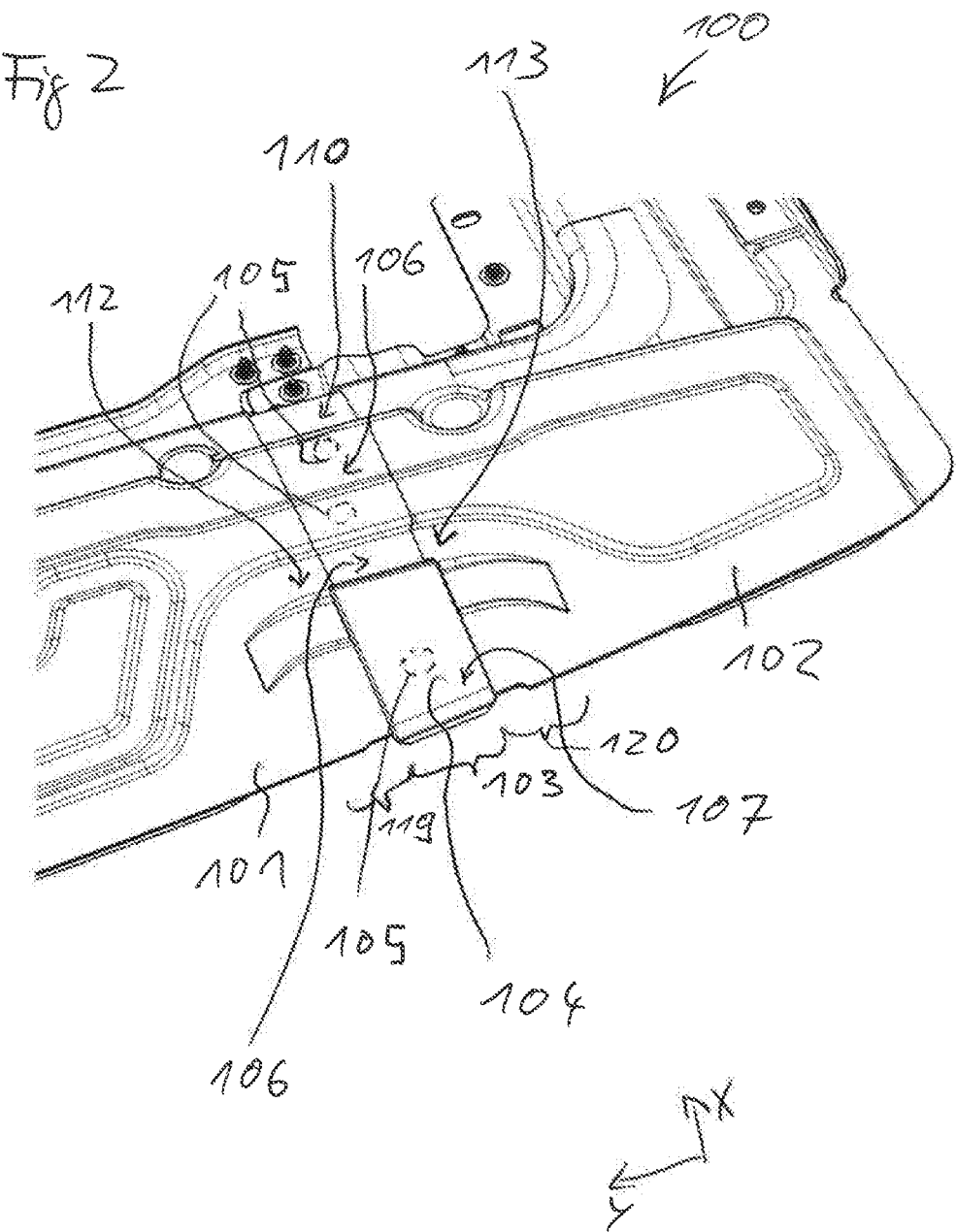

FIG. 2 shows a schematic illustration of an assembly 100 which comprises the two roof frame elements 101, 102. For example, the first roof frame element 101 extends substantially along the Y direction along the windscreen 3 during operation. The second roof frame element 102 extends substantially along the X direction at the side of the roof opening 5 during operation. According to some illustrative embodiments, a further roof element, which extends substantially along the Y direction, is also arranged at the end of the roof opening 5 which faces the rear window 4. According to some illustrative embodiments, it is possible to dispense with this further roof element.

In the state of readiness for operation, a further, second roof element 102 (not explicitly illustrated) extends in the second lateral region of the roof opening 5. The two sides are of mutually corresponding construction. Only one side will therefore be described below.

The first roof frame element 101 and the second roof frame element 102 are arranged so as to overlap one another in a region of overlap 103. In the region of overlap 103, the first roof frame element 101 and the second roof frame element 102 are connected to one another. In particular, the two roof frame elements 101, 102 are connected positively to one another, e.g. by means of rivets, in the region of overlap 103. Other types of connection which ensure sufficiently rigid connection of the two roof frame elements 101, 102 to one another are also possible.

The two roof frame elements 101, 102 are connected to one another at a plurality of discrete joining locations 105. Provided at each of the joining locations 105 there is, for example, a rivet which penetrates the two roof frame elements 101, 102 along the Z direction and thus connects them to one another. Along the X direction, the joining locations 105 are arranged offset relative to one another along the region of overlap 103. Along the X direction, the joining locations 105 are arranged one behind the other along the region of overlap 103. Along the X direction, the joining locations 105 are arranged in a manner displaced relative to one another along the region of overlap 103.

A plastic jacket 104 is provided in the region of overlap 103. The plastic jacket 104 completely covers the joining locations 105. It is possible for the rear joining location 105 to be covered by foam on only one side, facing the wet region, and not to be covered by foam on the opposite side. The plastic jacket 104 serves to seal off the joining locations 105. The roof frame elements 101, 102, which consist of a steel sheet for example, are thereby adequately protected from corrosion and moisture in the region of the joining locations 105.

The plastic jacket 104 extends along the Y direction from one roof frame element 101, completely over the region of overlap 103, to the second roof frame element 102. Thus, the region of overlap 103 is sufficiently sealed by means of the plastic jacket 104. Moreover, a smooth transition is achieved between the two roof frame elements 101, 102, despite the region of overlap 103.

An adhesive bonding location 106 is formed on the plastic jacket 104. In particular, the adhesive bonding location 106 is formed on a first outer side 107 of the plastic jacket 104. The adhesive bonding location 106 is used for the application of an adhesive 109 (e.g. FIG. 3).

A surface 112 of the first roof frame element 101 and the adhesive bonding location 106 of the plastic jacket 104 adjoin one another in a flush manner. Particularly in an adjoining region 119 of the first roof frame element 101 which immediately adjoins the region of overlap 103, the surface 112 is formed in the same plane as the surface of the adhesive bonding location 106 in the Z direction. As a result, a stepless transition is achieved between the first roof frame element 101 and the adhesive bonding location 106.

In corresponding fashion, a surface 113 of the second roof frame element 102 is formed flush with the adhesive bonding location 106 in an adjoining region 120. On the second roof frame element 102, the adjoining region 120 directly adjoins the region of overlap 103. Particularly in the adjoining region 120, the surface 113 of the second roof frame element 102 is formed in the same plane as the surface of the adhesive bonding location 106 in the Z direction. Thus, a smooth transition is achieved between the adhesive bonding location 106 and the second roof frame element 102. Thus, the surface 112 in the adjoining region 119, the surface of the adhesive bonding location 106 and the surface 113 in the adjoining region 120 are formed flush with one another. This allows reliable adhesive bonding even in the region of overlap 103 and especially at the transitions between the roof frame elements 101, 102 and the plastic jacket 104.

The adhesive bonding location 106 is formed offset with respect to the joining locations 105 along the X direction. The adhesive bonding location 106 is formed between the joining locations 105 along the X direction. The region of overlap 103 extends in a main direction along the X direction. Along this main direction, one of the joining locations 105 is formed first in the illustrative embodiment illustrated. The adhesive bonding location 106 is then formed. Another of the joining locations 105 is then formed. Another adhesive bonding location 106 is then formed. Once again, a joining location 105 is then formed. A sealing location 110 is then formed. The sequence and number of the different locations should be interpreted as being purely illustrative and, according to further illustrative embodiments, differs from the illustration in FIG. 2.

Figure 3:
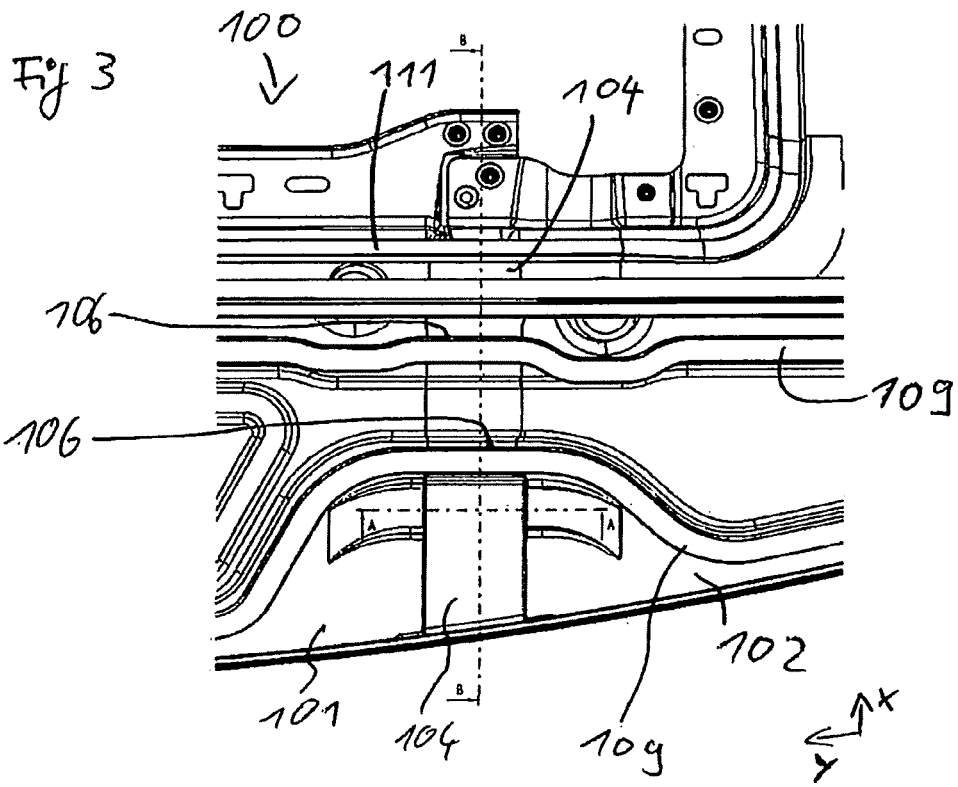

The sealing location 110 is used for the application of a seal 111 (e.g. FIG. 3). At the sealing location 110, the roof frame element 101, the plastic jacket 104 and the second roof frame element 102 adjoin one another in a flush manner, in a way similar to the embodiment of the adhesive bonding location 106. The surface 112 of the first roof frame element 101, the surface of the sealing location 110 and the surface 113 of the second roof frame element 102 are arranged in one plane in the Z direction, thus ensuring that a smooth transition is achieved.

FIG. 3 shows a schematic illustration of the assembly 100. In addition to the assembly 100 shown in FIG. 2, the adhesive 109 and the seal 111 are illustrated in the illustration according to FIG. 3. The adhesive 109 extends along the Y direction from the first roof frame element 101, over the adhesive bonding location 106 of the plastic jacket 104, to the second roof frame element 102. By means of the covering of the region of overlap 103 by means of the plastic jacket 104, the smooth transition between the two roof frame elements 101, 102 is achieved. This enables the adhesive 109, which is designed, in particular, as an adhesive bead, to be bonded reliably even in the region of overlap 103.

The flush ending of the two roof frame elements 101, 102 and of the plastic jacket 104 prevents detachment of the adhesive 109 in the transitional regions, which could occur with a stepped transition. The same applies to the seal 111. Reliable connection of the assembly 100 to the seal 111 and to the adhesive 109 is thereby possible. This also leads to adequate leak-tightness relative to moisture and water and, in particular, reliably counteracts capillary effects.

Figure 4:
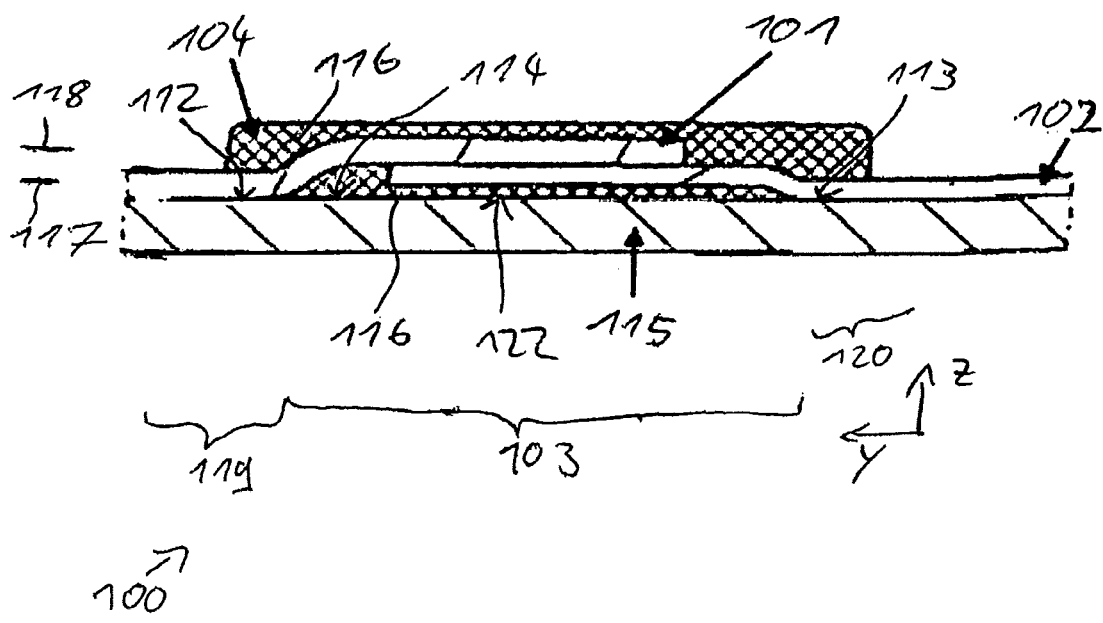

FIG. 4 shows a schematic illustration of a cross section of the assembly 100 in the region of overlap 103 and the adjoining regions 119 and 120. FIG. 4 shows a further adhesive 115, which is arranged in the Z direction on a lower side of the assembly 100 (cf. FIG. 5). The further adhesive 115 is arranged at a further adhesive bonding location 114 and, in a manner comparable to the adhesive 109, extends from the first roof frame element 101, along the plastic jacket 104, to the second roof frame element 102.

The first roof frame element 101 and the second roof frame element 102 each have a step in the region of overlap 103. The two roof frame elements 101, 102 are each formed with an offset in the Z direction in the region of overlap 103, at least at certain points. In the adjoining regions 119 and 120, the two roof frame elements 101, 102 extend in a plane 117, for example. In the region of overlap 103, the roof frame elements 101, 102 extend along planes 118, which extend at a distance from plane 117 in the Z direction. Thus, a clearance is formed between the roof frame elements 101, 102 and a surface 122 of the plastic jacket 104 in the region of overlap 103. Thus, a sufficient material flow of a plastic 116 is possible in the entire region during the production of the plastic jacket 104 and, at the same time, flush adjoining of the surface 122 of the plastic jacket 104 with surface 112 and surface 113 can be achieved.

Figure 5:
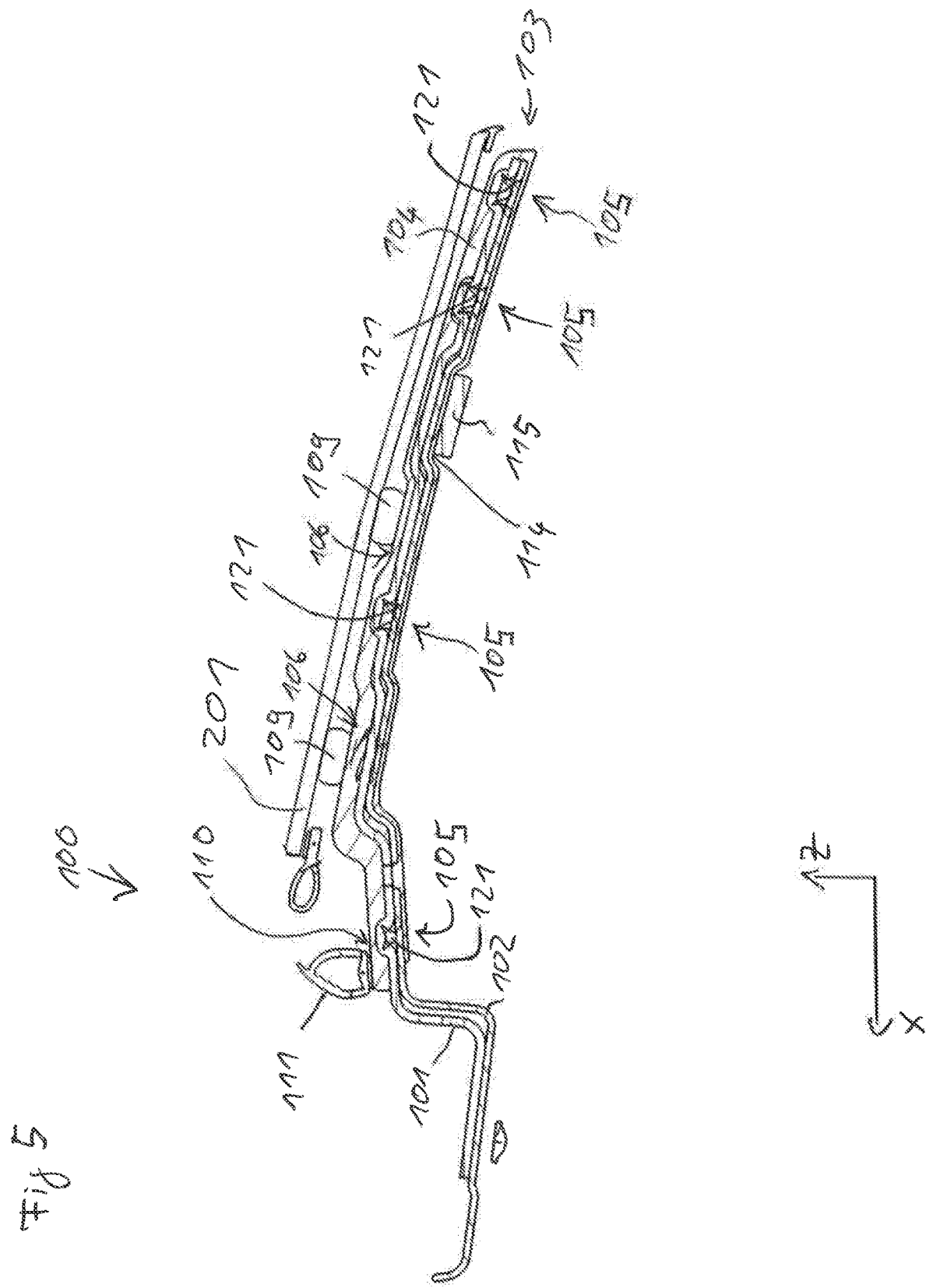

FIG. 5 shows an illustration of the assembly in another cross section. Along the X direction, the joining locations 105 with respective joining elements 121, e.g. rivets or screws or the like, the adhesive bonding locations 106, the sealing location 110 and the further adhesive bonding location 114 are each arranged offset relative to one another in the region of overlap 103. Along the X direction, the joining locations 105, the adhesive bonding locations 106, the sealing location 110 and the further adhesive bonding location 114 are arranged adjacent to one another in the region of overlap 103. The individual locations 105, 106, 110, 114 are arranged alternately, and therefore, in particular, they do not overlap one another. It is thereby possible to achieve a small installation space in the Z direction, and, in particular, said space does not differ or differs only insignificantly from an integral roof frame 200.

It is thus possible, with the two roof frame elements 101, 102, to achieve a modular construction of the assembly 100 which has similar, comparable properties to an integral roof frame. The two roof frame elements 101, 102 are arranged offset with respect to one another in the Z direction in respect of the adhesive bonding locations 106 at the further adhesive bonding location 114, for example. It is thereby possible to achieve the small installation space requirement in the Z direction, and reliable production of the plastic jacket 104 is simultaneously possible since a sufficiently thick plastic layer can always be achieved.

The installation space requirement in the Z direction of the individual functional elements, such as the adhesive 109, the further adhesive 115 and the joining elements 121, is not added to by the mutually offset arrangement. The plastic jacket 104 enables the smooth surface of the assembly, especially in the transitional regions at functional locations 105, 106, 110, 114, and thereby allows reliable application of the adhesive 109, of the further adhesive 115 and of the seal 111.

Figure 6:
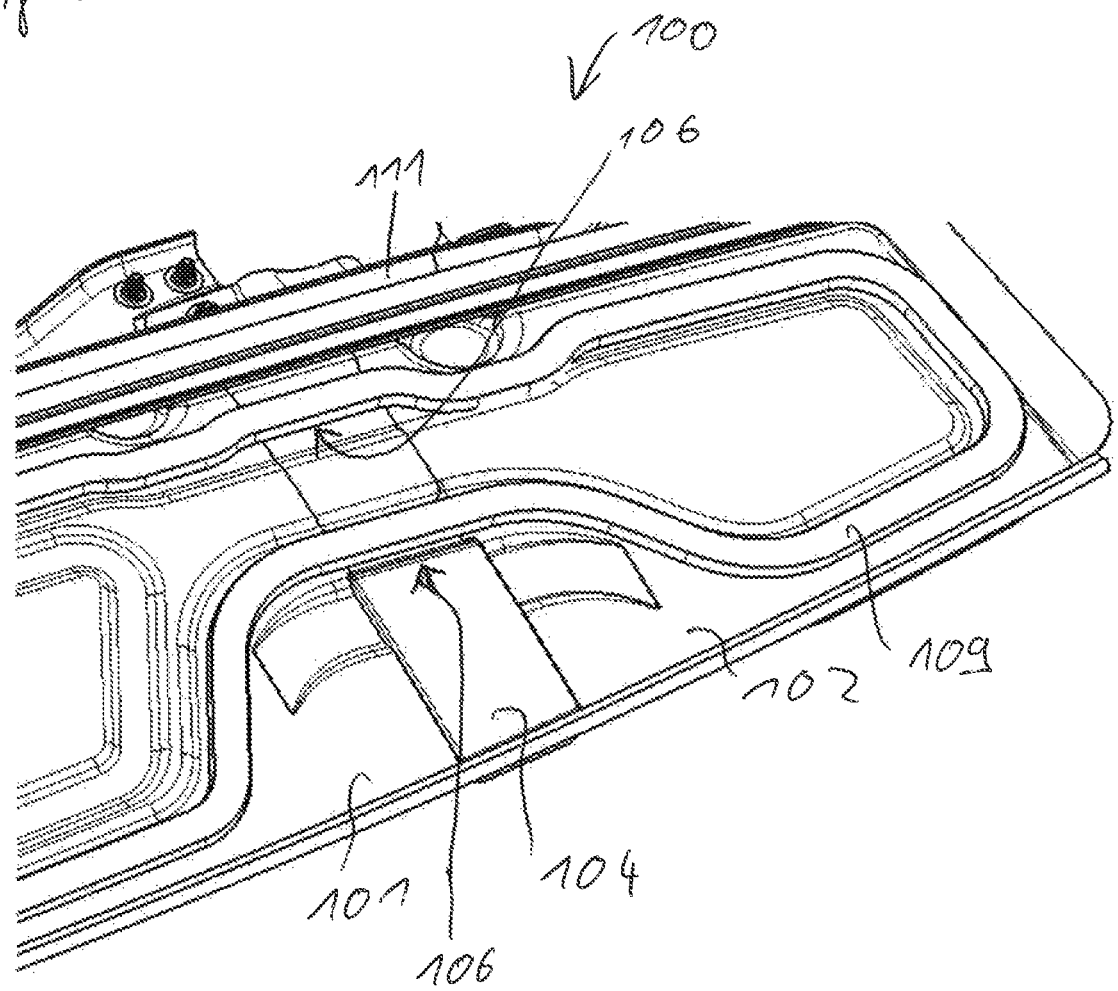

FIG. 6 shows another illustration of the assembly 100. The plastic jacket 104 seals off the two roof frame elements 101, 102 reliably from one another and allows the application of the adhesive 109 and of the seal 111, which each extend from the first roof frame element 101 to the second roof frame element 102.

Figure 7:
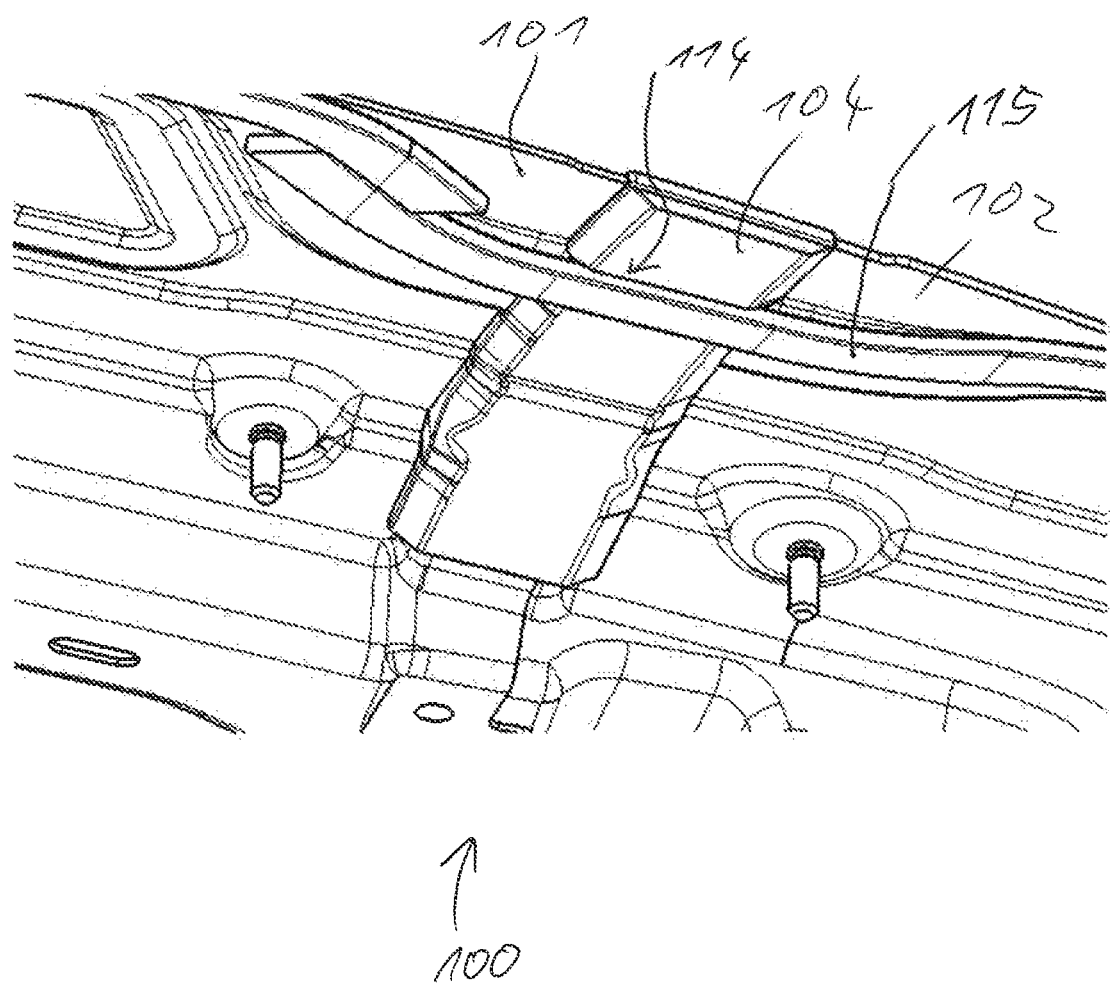

FIG. 7 shows another illustration of the assembly 100. The side of the assembly 100 which is illustrated in FIG. 7 faces the passenger compartment of the motor vehicle 1 during operation. The plastic jacket 104 is designed in such a way that it ends flat and flush with the adjoining roof frame elements 101, 102, particularly at the further adhesive bonding location 114. Thus, the further adhesive 115 is reliably and leak-tightly connected to the roof frame elements 101, 102 and the plastic jacket 104. The further adhesive 115 extends from the first roof frame element 101 to the second roof frame element 102.

The adhesive 109 (FIG. 6) is used to attach the cover 201, for example. The further adhesive 115 is used to connect the roof frame elements 101, 102 to a body of the motor vehicle 2, for example. The seal 111 is used to seal off the roof frame elements 101, 102 and the cover panel 106 from one another, for example.

The roof frame 200, the roof frame elements 101, 102 of which are formed from a steel sheet, for example, allows modular construction with sufficiently high rigidity at the same time. Moreover, with a modular construction, the roof frame 200 allows the attachment of a multiplicity of subassemblies, e.g. the mechanism for the movable cover panel 6. Furthermore, the roof frame 200 allows attachment to the body shell of the motor vehicle 2 by means of the further adhesive 115, which is designed as a peripherally applied adhesive bead, for example. Thus, a material connection is formed between the roof frame 200 and the motor vehicle 2. This not only ensures force transmission but also sealing of the vehicle interior with respect to water and other fluids.

The cover 201 or a plurality of covers can be attached to the side of the roof frame 200 which faces outward during operation by means of the adhesive 109, for example. The adhesive 109 is applied as an adhesive bead, for example. Moreover, the seal 111 separating a wet region from a dry region can be bonded on. Here too, water-tightness can be reliably achieved.

The functions enumerated can be reliably achieved with the roof frame 200 of modular construction by virtue of the design of the plastic jacket 104 with the described properties in the region of overlap 103 between roof frame element 101 and roof frame element 102. At the same time, the offset arrangement of the individual functional locations 105, 106, 110, 114 allows a small installation space requirement. Thus, sufficiently high force transmission between the two roof frame elements 101, 102 is achieved and, at the same time, leak-tightness, particularly with respect to capillary effects, is ensured. The seal 111 and the adhesives 109, 115 are arranged in a space-saving manner. The two overlapping roof frame elements 101, 102 are connected positively to one another by means of a riveted joint, for example, in order to ensure force transmission. This connection is achieved at the joining locations 105, which are arranged offset with respect to the adhesive bonding locations 106, 114 and the sealing location 110.

After the connection of the two roof frame elements 101, 102 to one another, the region of overlap 103 with the joining elements 121 is surrounded with foamed plastic 116 for example, in particular with polyurethane, in order to seal off the contact surfaces from water as well and to create a smooth and gap-free surface for the application of the seal 111 and of the adhesives 109, 115. The alternating offset arrangement of the joining location 105, of the adhesive bonding locations 106, 114 and of the sealing location 110 enables the individual functions with the associated attachments to be accommodated in a space-saving manner.

The modular roof frame 200 with the two or more roof frame elements 101, 102 allows reliable force transmission, even in the case of roof frame elements 101, 102 with different sheet thicknesses and sheet strengths. Moreover, smooth adhesive bonding surfaces for the attachment of seals and/or adhesive beads are achieved. Leaks and capillary effects can be reliably avoided. A minimal installation space is taken up since the individual functional elements are arranged alternately and offset with respect to one another.

The invention claimed is:

1. An assembly for two roof frame elements for a vehicle roof of a motor vehicle comprising:
   the two roof frame elements are arranged relative to one another that a region of overlap is formed at offset end regions, in which the two roof frame elements overlap one another, and a plastic jacket, which covers the region of overlap and seals off the region of overlap,
   wherein the following are formed along the region of overlap in a manner offset with respect to one another:
   a joining location, at which the two roof frame elements are connected to one another and which is covered by the plastic jacket in order to seal off the joining location, an adhesive bonding location, which is formed on an inner side of the plastic jacket, for the application of an adhesive, and
   in an adjoining region of the first roof frame element which immediately adjoins the region of overlap, a surface of the adjoining region is formed in the same plane as a surface of the adhesive bonding location in the Z direction.

2. The assembly according to claim 1, wherein the following are formed along the region of overlap in a manner offset with respect to the joining location and the adhesive bonding location: a sealing location, which is formed on an inner side of the plastic jacket, for the application of a seal.

3. The assembly according to claim 2, wherein the two roof frame elements each have a surface outside the region of overlap, wherein the inner side of the plastic jacket and the surfaces of the roof frame elements adjoin one another in a flush manner at the adhesive bonding location and the sealing location.

4. The assembly according to claim 1, wherein the region of overlap is arranged transversely to the two main directions of extent (X, Z) of the region of overlap in a manner offset with respect to adjoining regions of the roof frame elements.

5. The assembly according to claim 1, wherein the following are formed along the region of overlap in a manner offset with respect to the joining location and the adhesive bonding location: a further adhesive bonding location which is formed on an outer side of the plastic jacket, for the application of a further adhesive, wherein the outer inner side and the outer side are situated opposite one another.

6. The assembly according to claim 1, wherein the roof frame elements are connected at least one of positively and materially to one another.

7. The assembly according to claim 1, wherein the roof frame elements each comprise coated steel sheet.

8. The assembly according to claim 1 wherein the plastic jacket is formed from a cured polyurethane.

9. A roof frame for a vehicle roof of a motor vehicle, comprising: an assembly according to claim 1, wherein the adhesive extends transversely to the region of overlap from one of the roof frame elements, along the adhesive bonding location, to the other of the roof frame elements.

10. The roof frame according to claim 9, further comprising a cover, which is connected to the assembly by means of a further adhesive.

11. The roof frame according to claim 9, further comprising a seal, wherein the seal extends transversely to the region of overlap from one of the roof frame elements, along the sealing location, to the other of the roof frame elements.

12. The roof frame according to claim 9, wherein a further adhesive extends transversely to the region of overlap from one of the roof frame elements, along the further adhesive bonding location, to the other of the roof frame elements.

13. A roof for a motor vehicle, having a roof frame according to claim 9, wherein the roof frame is connected to a body of the motor vehicle by a further adhesive.

* * * * *